2,765,343

CRYSTALLIZABLE PENTAENE ALDEHYDE COMPLEXES

Charles H. Benton and Charles D. Robeson, Rochester, N. Y., assignors to Eastman Kodak Company, Rochester, N. Y., a corporation of New Jersey No Drawing. Application March 1, 1954,
Serial No. 413,418

18 Claims. (Cl. 260—598)

This invention relates to crystallizable complexes of trans,trans pentaene aldehydes having the carbon skeleton and chemical composition of vitamin A aldehyde and is particularly concerned with crystallizable complexes of 2,6-trans,trans vitamin A aldehyde.

Vitamin A aldehyde is itself an active form of vitamin A material and also is useful as an intermediate material for conversion to vitamin A alcohol and vitamin A esters such as the acetate and the palmitate which are in common commercial use. Vitamin A aldehyde exists in several isomeric forms. Thus, vitamin A aldehyde exists in the form of geometrical isomers based on the cis or trans configuration around the olefinic double bonds in the 2 and 6 positions as starred in the following formula:

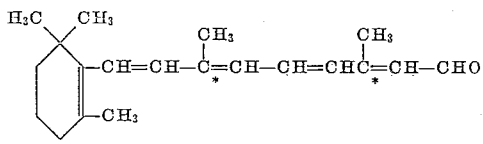

The geometrical isomers include 2,6-trans,trans vitamin A aldehyde; 2,6-cis,cis vitamin A aldehyde; 2-trans-6-cis vitamin A aldehyde; and 2-cis-6-trans vitamin A aldehyde. Of the geometrical isomers, however, the 2,6-trans,trans form exhibits the highest biological activity and it is therefore desirable to separate the 2,6-trans,trans aldehyde from the cis forms when, as is often the case, they occur in admixture. Because of the closely related properties of the cis and trans forms, however, it is difficult to effect such separations.

It is accordingly an object of this invention to selectively convert the trans,trans pentaenals having the carbon skeleton and chemical composition of vitamin A aldehyde to derivatives which can be readily separated from the cis forms.

It is another object of this invention to provide new crystallizable derivatives of trans,trans pentaenals corresponding to vitamin A aldehyde from which the trans,trans pentaenal can readily be regenerated.

It is a further object of this invention to facilitate the separation of highly active forms of vitamin A aldehyde from closely related isomers having lower biological activity.

Another object of the invention is to provide crystallizable complexes of trans,trans vitamin A aldehyde unmixed with any substantial amount of cis forms of vitamin A aldehyde.

Another object of the invention is to provide selective trans,trans vitamin A aldehyde complexes.

Other objects will be apparent from the description and claims which follow.

These and other objects are attained by means of this invention as described more fully hereinafter with particular reference to preferred embodiments thereof. We have discovered that phenolic materials having the formulas

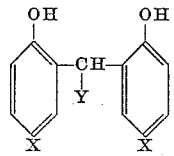

and

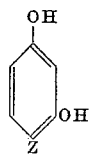

where X is an alkoxy radical or a hydroxyl radical, Y is an alkyl radical or a hydrogen atom and Z is a halogen atom, selectively form crystallizable complexes with 2,6-trans,trans pentaenals having the vitamin A aldehyde carbon skeleton and chemical composition but do not form crystallizable complexes with the isomeric cis forms of such aldehydes such as the cis,cis forms, the cis,trans forms, or the trans,cis forms.

Alkyl and alkoxy radicals in the above-disclosed phenolic complexing materials are preferably radicals of one to six carbon atoms, although alkyl and alkoxy radicals of greater than six carbon atoms can be suitably employed. Likewise, any of the halogens such as chlorine, bromine, iodine and fluorine can be substituted as halogens in the above-mentioned phenols.

Among the suitable complexing materials are 2,2'-alkyl-bis-(4-alkoxy phenols) such as 2,2'-isobutylidene-bis-(4-methoxyphenol), 2,2'-methylene-bis-(4-butoxyphenol) and 2,2'-octylidene-bis-(4-ethoxyphenol); 2,2'-alkyl-bis-(hydroquinones) such as 2,2'-isobutylidene-bis-(hydroquinone) and 2,2'-octylidene-bis-(hydroquinone); 3-hydroxy-4-halogen substituted phenols such as 3-hydroxy-4-chlorophenol and 3-hydroxy-4-bromophenol; and like compounds having the formulas as set out hereinabove.

The exact nature of the separable complex formed is not known, but the aldehyde is readily regenerated in unchanged form by washing with aqueous alkali or the like. The product thus appears to be a complex rather than a chemically substituted derivative. All of the herein-mentioned phenolic complexing materials will form complexes consisting of one molecule of the phenolic material and two molecules of 2,6-trans,trans vitamin A aldehyde. However, one molecule of the 2,2'-alkyl-bis-(4-alkoxyphenols) will also complex with one molecule of 2,6-trans,trans vitamin A aldehyde.

The complexes are readily formed by adding the complexing material to a solution of the trans,trans pentaenal in an inert organic solvent such as petroleum ether, hexane or a similar low boiling petroleum fraction, ethyl ether, methanol, ethanol, benzene or the like, or by adding the complexing material directly to a liquid mixture containing the trans,trans pentaenal if the complexing material is soluble in the mixture under the conditions of addition. The complex is formed upon standing at room temperature, but slightly elevated temperatures, such as 40-70° C., are desirably used to aid in dissolving the phenolic complexing material. The complexes formed in accordance with this invention are then separated from the mixture by such methods as crystallization, distillation, adsorption and other well-known separating methods. The separation is readily accomplished because the chemical and physical properties of the complex differ greatly from the uncomplexed cis isomers left in the reaction mixture. The complexes embodying the invention are readily crystallizable and have relatively low solubility in inert organic solvents. The separation is thus readily accomplished by cooling and concentrating the reaction mixture to cause fractional crystallization of the complex. With solvents such as petroleum ether, ethyl ether or the like, crystallization occurs readily at room temperature, although lower temperatures can be used if desired. Alternatively, the entire reaction mixture can be dried and the uncomplexed cis isomers leached out of the solid residue with an organic solvent, the cis forms of vitamin A aldehyde being readily soluble in most common organic solvents.

The invention is illustrated by the following examples of certain preferred embodiments thereof, it being understood that the examples are not intended to limit the scope of the invention unless otherwise specifically indicated.

Example 1

A 1.5 g. sample of 2,2'-isobutylidene-bis-(4-methoxyphenol) in an ethyl ether solution was combined with a mixed trans and cis isomeric vitamin A aldehyde sample containing 2.9 g. of crystalline 2,6-trans, trans vitamin A aldehyde in 9 ml. of ethyl ether. An 18 ml. portion of low-boiling petroleum ether was added to the combined solutions, the resulting solution chilled to −20° C. and the complex separated by filtration from the solvent. The separated complex, composed of one molecule of 2,2'-isobutylidene-bis-(4-methoxyphenol) and two molecules of 2,6-trans, trans vitamin A aldehyde, was bright orange, had a melting range of 78.4–80.4° C. and $$E_{1\ cm.}^{1\%} (380\ mu) = 1055$$

Example 2

A duplication of Example 1 in a methanol solvent in lieu of the low-boiling petroleum ether solvent used in Example 1 yielded a complex composed of one molecule of 2,2'-isobutylidene-bis-(4-methoxyphenol) and one molecule of 2,6-trans, trans vitamin A aldehyde. The complex was orange-red, melted 80.0–82.0° C. and $$E_{1\ cm.}^{1\%} (380) = 716$$

Example 3

A .005 mole sample of 2,2'-isobutylidene-bis-(hydroquinone) in an ethyl ether solution was combined with a mixed trans and cis isomeric vitamin A aldehyde sample containing .01 mole of 2,6-trans, trans vitamin A aldehyde in an ether solution. A 3 ml. portion of low-boiling petroleum ether was added to the combined solutions and the resulting solution was chilled to −20° C. and the crystallized complex separated by filtration from the solvent. The separated complex was composed of one molecule of 2,2'-isobutylidene-bis-(hydroquinone) and two molecules of 2,6-trans, trans vitamin A aldehyde. The complex was yellow-orange, melted 139.7–141.7° C. and $$E_{1\ cm.}^{1\%} (381) = 1189$$

Example 4

To a mixed trans and cis isomeric vitamin A aldehyde sample containing 2.66 g. of 2,6-trans, trans vitamin A aldehyde in 10 ml. of ether was added 1.45 g. of 3-hydroxy-4-chlorophenol. The mixture was warmed and 5 ml. of petroleum ether (boiling range 40–60° C.) was added. The solution was evaporated to a small volume and cooled to −20° C. The resulting crystalline complex, composed of two molecules of 2,6-trans, trans vitamin A aldehyde and one molecule of 3-hydroxy-4-chlorophenol, was filtered and dried under vacuum. The complex crystals were yellow-brown in color, melted 67.0–68.4° C. and $$E_{1\ cm.}^{1\%} (380) = 1199$$

Similar results are obtained with other complexing materials as described hereinabove when reacted with 2,6-trans, trans pentaenals having the vitamin A aldehyde carbon skeleton and chemical composition. Since the cis forms of vitamin A aldehyde do not form crystallizable complexes in accordance with this invention, the 2,6-trans, trans complexes are readily separated from impure mixtures of the trans, trans aldehyde with cis isomers thereof, and pure trans, trans vitamin A aldehyde is readily obtained by washing the complexing material out of the crystalline complex product with aqueous alkali.

Although the invention has been described in considerable detail with reference to certain preferred embodiments thereof it will be understood that variations and modifications can be effected within the spirit and scope of the invention as described hereinabove and as defined in the appended claims.

We claim:

1. A crystallizable complex of a 2,6-trans, trans pentaene aldehyde having the carbon skeleton and chemical composition of vitamin A aldehyde with a member selected from the group consisting of compounds with the formulas

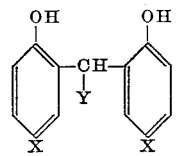

and

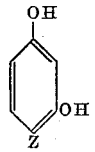

where X is selected from the group consisting of alkoxy radicals and hydroxyl radicals, Y is selected from the group consisting of hydrogen atoms and alkyl radicals, and Z is a halogen atom, said complex being crystallizable in inert organic solvents.

2. A crystallizable complex consisting of two molecules of a 2,6-trans, trans pentaene aldehyde having the carbon skeleton and chemical composition of vitamin A aldehyde and one molecule of a member selected from the group consisting of compounds with the formulas

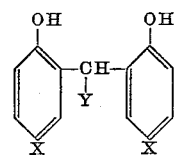

and

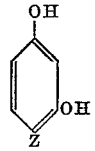

where X is selected from the group consisting of alkoxy radicals and hydroxyl radicals, Y is selected from the group consisting of hydrogen atoms and alkyl radicals, and Z is a halogen atom, said complex being crystallizable in inert organic solvents.

3. A crystallizable complex of a 2,6-trans, trans pentaene aldehyde having the carbon skeleton and chemical composition of vitamin A aldehyde with a compound of the formula

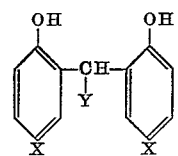

where X is selected from the group consisting of alkoxy radicals and hydroxyl radicals, and Y is selected from the group consisting of hydrogen atoms and alkyl radicals, said complex being crystallizable in inert organic solvents.

4. A crystallizable complex of a 2,6-trans, trans pentaene aldehyde having the carbon skeleton and chemical composition of vitamin A aldehyde with a compound of the formula

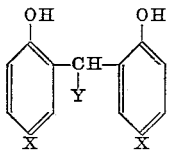

where X is selected from the group consisting of lower alkoxy radicals and hydroxyl radicals, and Y is selected from the group consisting of hydrogen atoms and lower alkyl radicals, said complex being crystallizable in inert organic solvents.

5. A crystallizable complex of a 2,6-trans, trans pentaene aldehyde having the carbon skeleton and chemical composition of vitamin A aldehyde with a compound of the formula

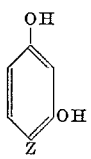

where Z is a halogen atom, said complex being crystallizable in inert organic solvents.

6. A crystallizable complex of a 2,6-trans, trans pentaene aldehyde having the carbon skeleton and chemical composition of vitamin A aldehyde with 2,2'-isobutylidene - bis - (4-methoxyphenol), said complex being crystallizable in inert organic solvents.

7. A crystallizable complex of a 2,6-trans, trans pentaene aldehyde having the carbon skeleton and chemical composition of vitamin A aldehyde with 2,2'-isobutylidene-bis-(hydroquinone), said complex being crystallizable in inert organic solvents.

8. A crystallizable complex of a 2,6-trans, trans pentaene aldehyde having the carbon skeleton and chemical composition of vitamin A aldehyde with 3-hydroxy-4-chlorophenol, said complex being crystallizable in inert organic solvents.

9. A crystallizable complex consisting of one molecule of a 2,6-trans, trans pentaene aldehyde having the carbon skeleton and chemical composition of vitamin A aldehyde with one molecule of a 2,2'-alkyl-bis-(4-alkoxyphenol), said complex being crystallizable in inert organic solvents.

10. The method which comprises admixing a mixture containing a 2,6-trans, trans pentaenal having the carbon skeleton and chemical composition of vitamin A aldehyde with a phenol selected from the group consisting of compounds with the formulas

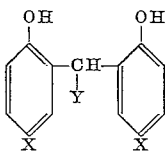

and

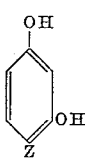

where X is selected from the group consisting of alkoxy radicals and hydroxyl radicals, Y is selected from the group consisting of hydrogen atoms and alkyl radicals, and Z is a halogen atom, and thereby forming a crystallizable complex of said phenol and said pentaenal, and separating said complex from said mixture.

11. The method which comprises admixing a mixture containing a 2,6-trans, trans pentaenal having the carbon skeleton and chemical composition of vitamin A aldehyde with a phenol selected from the group consisting of compounds with the formulas

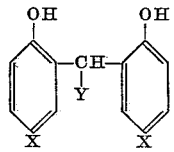

and

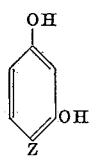

where X is selected from the group consisting of alkoxy radicals and hydroxyl radicals, Y is selected from the group consisting of hydrogen atoms and alkyl radicals, and Z is a halogen atom, and thereby forming a crystallizable complex consisting of one molecule of said phenol and two molecules of said pentaenal and separating said complex from said mixture.

12. The method which comprises admixing a phenolic compound of the formula

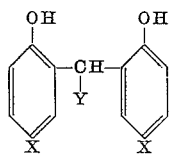

where X is selected from the group consisting of alkoxy radicals and hydroxyl radicals, and Y is selected from the group consisting of hydrogen atoms and alkyl radicals, with a mixture containing a 2,6-trans, trans pentaenal having the carbon skeleton and chemical composition of vitamin A aldehyde, and thereby forming a crystallizable complex of said phenolic compound and said pentaenal, and separating said complex from said mixture.

13. The method which comprises admixing a phenolic compound of the formula

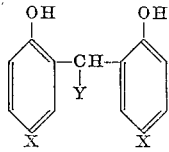

where X is selected from the group consisting of lower alkoxy radicals and hydroxyl radicals, and Y is selected from the group consisting of hydrogen atoms and lower alkyl radicals, with a mixture containing a 2,6-trans, trans pentaenal having the carbon skeleton and chemical composition of vitamin A aldehyde, and thereby forming a crystallizable complex of said phenolic compound and said pentaenal, and separating said complex from said mixture.

14. The method which comprises admixing a phenolic compound of the formula

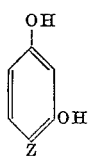

where Z is a halogen atom, with a mixture containing a 2,6-trans, trans pentaenal having the carbon skeleton and chemical composition of vitamin A aldehyde and thereby forming a crystallizable complex of said phenolic compound and said pentaenal, and separating said complex from said mixture.

15. The method which comprises admixing 2,2′-isobutylidene-bis-(4-methoxyphenol) with a mixture containing a 2,6-*trans*, trans pentaenal having the carbon skeleton and chemical composition of vitamin A aldehyde and thereby forming a crystallizable complex of said 2,2′-isobutylidene-bis-(4-methoxyphenol) and said vitamin A aldehyde, and separating said complex from said mixture.

16. The method which comprises admixing 2,2′-isobutylidene-bis-(hydroquinone) with a mixture containing a 2,6-trans, trans pentaenal having the carbon skeleton and chemical composition of vitamin A aldehyde and thereby forming a crystallizable complex of said 2,2′-isobutylidene-bis-(hydroquinone) and said vitamin A aldehyde, and separating said complex from said mixture.

17. The method which comprises admixing 3-hydroxy-4-chlorophenol with a mixture containing a 2,6-trans, trans pentaenal having the carbon skeleton and chemical composition of vitamin A aldehyde and thereby forming a crystallizable complex of said 3-hydroxy-4-chlorophenol and said vitamin A aldehyde, and separating said complex from said mixture.

18. The method which comprises admixing a 2,2′-alkyl-bis-(4-alkoxyphenol) with a mixture containing 2,6-trans, trans vitamin A aldehyde admixed with a cis form of said aldehyde and thereby selectively forming a crystallizable complex consisting of one molecule of 2,6-trans, trans vitamin A aldehyde and one molecule of a 2,2′-alkyl-bis-(4-alkoxyphenol), and separating said complex from said mixture.

References Cited in the file of this patent
UNITED STATES PATENTS

| | | |
|---|---|---|
| 2,683,746 | Benton et al. | July 13, 1954 |
| 2,683,747 | Benton et al. | July 13, 1954 |